(12) United States Patent
Schmidt et al.

(10) Patent No.: US 6,470,876 B1
(45) Date of Patent: Oct. 29, 2002

(54) CATALYTIC HEATER ASSEMBLY

(75) Inventors: Franklin T. Schmidt, Mulvane; Randall L. May, Andover; David H. Linnebur, Derby, all of KS (US); Vernon M. Svitak, Jr., Scottsdale, AZ (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/637,390

(22) Filed: Aug. 11, 2000

Related U.S. Application Data

(63) Continuation-in-part of application No. 09/371,167, filed on Aug. 10, 1999, now Pat. No. 6,213,761.

(51) Int. Cl.[7] ............................................. F24C 3/04
(52) U.S. Cl. ..................... 126/89; 126/92 R; 431/344
(58) Field of Search .................................. 126/59, 92 R, 126/92 AC, 89, 85 A, 84; 431/344, 328, 258, 264, 355; 432/222; 34/96

(56) References Cited

U.S. PATENT DOCUMENTS

| | | | | |
|---|---|---|---|---|
| 2,817,000 A | * | 12/1957 | Scheid | 34/96 |
| 3,191,659 A | * | 6/1965 | Weiss | 431/258 |
| 4,488,536 A | * | 12/1984 | Kojima et al. | 431/344 |
| 4,635,382 A | * | 1/1987 | Bourdeau | 431/328 |
| 4,726,767 A | * | 2/1988 | Nakajima | 431/344 |
| 5,352,114 A | * | 10/1994 | Numoto et al. | 431/328 |
| 5,857,262 A | * | 1/1999 | Bonnema et al. | 431/344 |

FOREIGN PATENT DOCUMENTS

JP 3-25205 A * 2/1991 .................. 431/328

* cited by examiner

Primary Examiner—Sara Clarke
(74) Attorney, Agent, or Firm—Kramer, Levin, Naftalis & Frankel LLP

(57) ABSTRACT

A portable heater assembly includes a fan module, an electrical ignition assembly, a heating apparatus, and an encasement. The encasement supports and houses the fan module, the electrical ignition assembly, and the heating apparatus. The fan module includes a fan, an electric switch, and electrical wiring, the electrical wiring interconnecting the fan, electric switch and a power source. The electric switch activates the fan by forming a closed electrical circuit within the electrical wiring between the power source and the fan. The electrical ignition assembly includes an electrical ignition device, a spark-emitting electrode tip protruding from the electrical ignition device, and an ignition activator connected to the electrical ignition device by an activator connector. The heating apparatus includes a combustion chamber having a catalyst-containing substrate in proximity to the spark-emitting electrode tip, an air-fuel mixer connected to the combustion chamber, and regulator valve assembly connecting the air-fuel mixer to a source of fuel. The air-fuel mixer provides a uniform mixture of fuel and primary air that is ignited by the spark-emitting electrode tip for combustion in the combustion chamber. The use of primary air improves efficiency and reduces the reliance on secondary air. Limiting the proportion of primary air to approximately 15–20% of the stoichiometric mass of air required substantially reduces the emission of hazardous combustion by-products such as carbon monoxide.

20 Claims, 16 Drawing Sheets

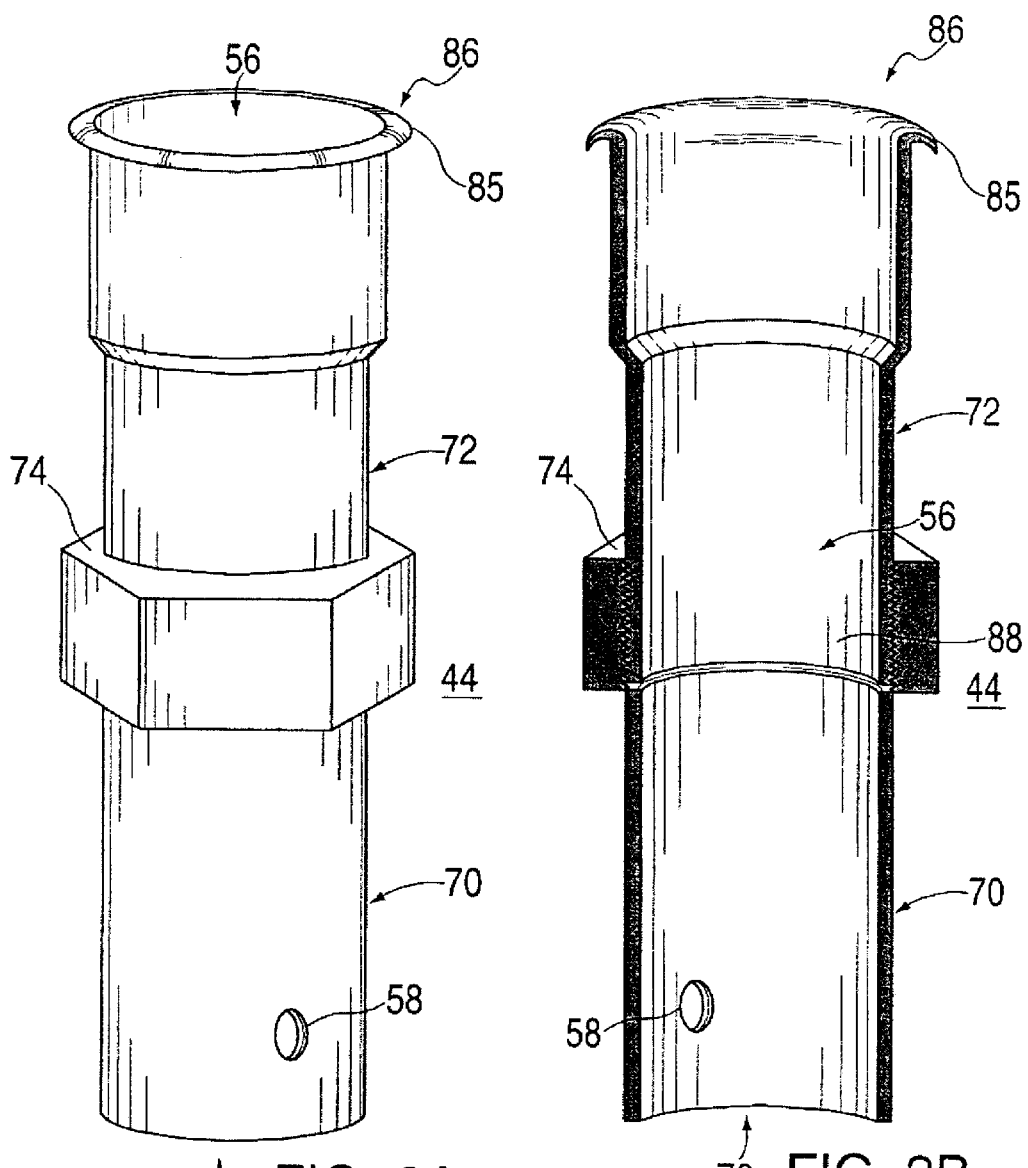
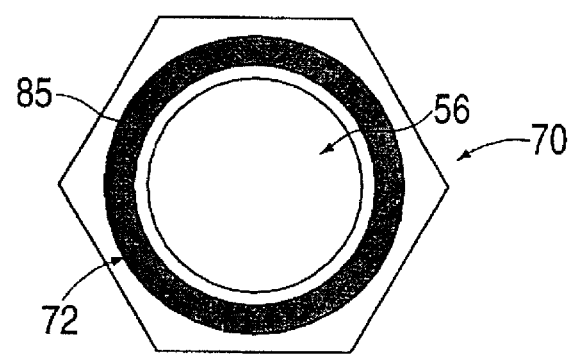
FIG. 3A  FIG. 3B  FIG. 3C

CATALYTIC HEATER ASSEMBLY

CROSS-REFERENCE TO RELATED APPLICATION

The present invention is a continuation-in-part of application Ser. No. 09/371,167, filed on Aug. 10, 1999, and issued as U.S. Pat. No. 6,213,761 on Apr. 10, 2001. The present application incorporates this related application by reference in its entirety.

FIELD OF THE INVENTION

The present application relates generally to portable heater assemblies, particularly to heater assemblies housing fans, igniters, and heating devices in which a highly efficient catalytic combustion apparatus is employed to generate heat from a vaporous fuel with reduced toxic emissions.

BACKGROUND INFORMATION

Heater assemblies are well known in the art. A typical heater assembly may house a source of heat, i.e., a heating device, a power source or a connection to a power source, a fan and a control device. An electrical heater, for example, may include electrical heating elements, an electrical cord, an electrical fan and a power switch. After connecting the electrical cord to a wall outlet, engaging the power switch may activate the electrical fan and the electrical heating elements. The fan may force air past the heating elements, heating the air by convection.

However, use of more complicated heating devices similarly complicates the assembly of the heater. Use of a catalytic combustion apparatus, for example, requires special considerations when designing a heater assembly. A portable catalytic combustion apparatus using a portable fuel source would be a desirable alternative to an electric heater when portability and freedom of movement are necessary. For example, an electric heater would be undesirable when an ample electric power source is not readily available, as may be the case when camping.

A typical catalytic combustion apparatus oxidizes a gaseous fuel, such as methane, butane or propane, at room temperature to generate heat. Generally, the fuel is introduced into a gas-tight housing where the fuel expands to completely fill the housing. As the fuel diffuses through a catalyst-containing substrate located at an outlet of the housing, ambient air mixes with the diffused fuel. The fuel-air mixture is then oxidized by a reaction promoted by the catalyst to produce heat. Such catalysts typically include noble metals such as platinum group metals or compounds containing the same. The substrates upon which the catalysts are supported are typically made from glass fibers, porous metals or ceramics such as ceramic wool or ceramic board and the like.

The products of the catalyst-enhanced oxidation reaction, such as carbon dioxide and water vapor, are discharged through the outside surface of the catalyst-containing substrate. Convection currents disperse the reaction products and draw in ambient air to provide oxygen to sustain the reaction. Igniting the reactants normally starts the reaction. Ignition usually requires a flame (e.g., a pilot light) or a spark, which may be induced, for example, by an electrical ignition.

A drawback of such known combustion apparatuses is reliance on convection currents to circulate the reactants (air and fuel) and to remove combustion products from the catalyst-containing reaction zone. A factor which contributes to controlling the rate of oxygen available per unit area of catalyst is the rate of convection flow over the active catalytic surface. Convection currents often produce irregular and erratic flows of reactants over the active catalytic surface. Under such conditions, there is typically an uneven distribution of oxygen and/or fuel within the reaction zone containing the catalyst. Consequently, when oxygen is available in less than a stoichiometric amount relative to the fuel, incomplete combustion of the fuel occurs resulting in harmful by-products including carbon monoxide, unburned fuel and the like. As carbon monoxide and unreacted fuel accumulate, a dangerous health hazard arises that could result in serious injury or death to occupants of an enclosed space in which the heating apparatus is used.

Consequently, a heater assembly using such a catalytic heating apparatus might encounter difficulties if a fan were blowing directly onto the heating element, in this case the catalyst-containing substrate. Air forced directly over the catalyst-containing element may unevenly distribute the fuel and oxygen, and it may cause unstoichiometric ratios of fuel to oxygen at the catalyst. Similarly, igniting the fuel at the catalyst with an open flame would be more difficult if air were being forced over catalyst.

SUMMARY OF THE INVENTION

The present application is directed generally to a portable heater assembly including an encasement, a fan, a battery pack, an igniter, power controls, and a heating apparatus with reduced toxic emissions. The heating apparatus may employ a highly efficient catalytic combustion apparatus to generate heat from a vaporous fuel. The heating apparatus may comprise a fuel source, an air inlet, a mixing device, and a catalyst-containing combustion chamber for generating heat. By virtue of being completely self-contained, an exemplary embodiment of the portable heating assembly may be moved easily and operated independently from outside power sources.

The air inlet may be in communication with the mixing device for creating a uniform fuel-air mixture with a desirable ratio of air to fuel before the fuel-air mixture is combusted in the catalyst-containing combustion chamber. Such pre-mixing of the fuel and air provides for a cleaner and more efficient heat generating combustion that results in substantially reduced emissions of toxic substances, such as carbon monoxide and unreacted fuel, and in an improved operating life of the apparatus.

In particular, one aspect of the present invention is directed to a heating apparatus that includes a combustion chamber having an inlet for receiving a uniform fuel-air mixture, and an outlet. The combustion chamber further includes a catalyst-containing substrate for initiating combustion of the fuel-air mixture. A fuel source and an air inlet are provided in communication with a mixing device for mixing the fuel and air under conditions which provide for a uniform fuel-air mixture, and for delivering the uniform fuel-air mixture through the inlet to the substrate in the combustion chamber to produce heat with minimal production of harmful by-products.

In an exemplary embodiment of the present invention, the encasement supports and encases the fan, the igniter, the power controls, the heating apparatus and the connection to the fuel source. The power controls include an electric switch, an ignition activator, and a fuel valve. The electric switch controls the fan by forming an electrical connection between a battery pack and the fan. The fuel valve regulates the flow of fuel, which in turn regulates whether heat is generated. The fan draws in outside air from around the encasement, and the encasement channels the forced air from the fan around the perimeter of the heating apparatus. Expelling the air around the perimeter of the heating apparatus avoids blowing the forced air directly at the catalyst-containing combustion chamber, which might interfere with the fuel-air mixture.

BRIEF DESCRIPTION OF THE DRAWINGS

FIG. 3A shows an enlarged perspective view of an embodiment of a fuel-air mixing assembly for use in the present invention.

FIG. 3B shows an enlarged longitudinal cross-sectional view of the fuel-air mixing assembly shown in FIG. 3A.

FIG. 3C is an enlarged top plan view of the fuel-air mixing assembly shown in FIG. 3A.

DETAILED DESCRIPTION

Figure 1:
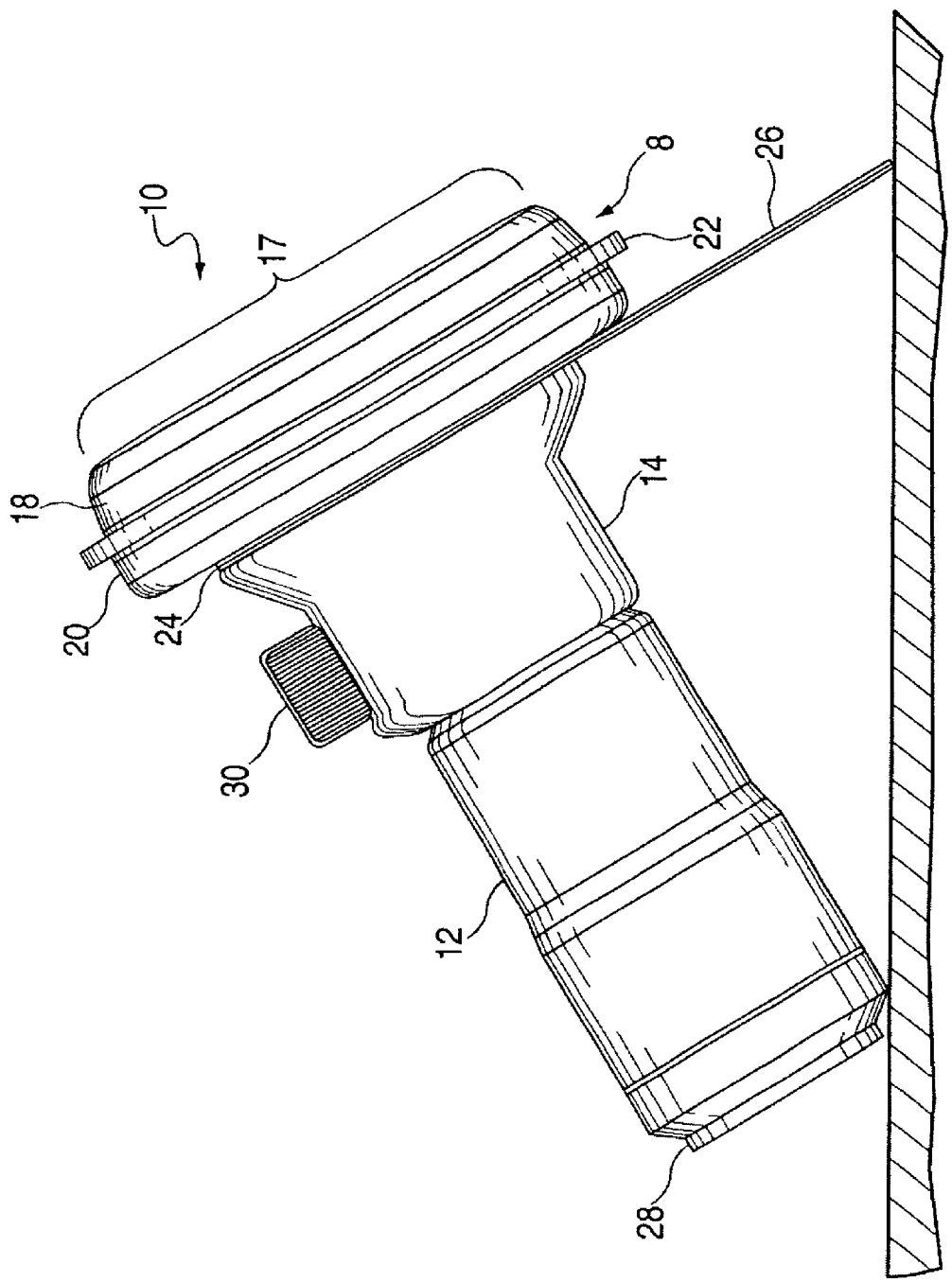
FIG. 1 is a side elevational view of an exemplary embodiment of a heating apparatus of the present invention.

The present application is directed to a heater assembly including an encasement, a fan, a battery pack, an electrical ignition assembly, power controls, and a heating apparatus with reduced toxic emissions. The heating apparatus may employ a highly efficient catalytic combustion apparatus to generate heat from a vaporous fuel. The heating apparatus may comprise a fuel source, an air inlet, a mixing device, and a catalyst-containing combustion chamber. Heat is generated through the catalytically accelerated reaction of a gaseous or vaporizable fuel and air mixture.

The heater assembly of the present invention can be used as a portable space heater for a variety of locations including tents, homes, factories, caravans, hatcheries, greenhouses, drying rooms and the like. The heating apparatus is constructed with the advantage of creating a uniform fuel-air mixture having a desirable air to fuel ratio. Such controlled pre-mixing of fuel and air provides for a cleaner and more efficient heat generating combustion resulting in substantially reduced emissions of toxic substances, such as carbon monoxide and unreacted fuel, and improved operating life of the apparatus. With substantially reduced toxic emissions, the heater assembly of the present invention provides for a non-toxic, reliable and highly efficient direct heating system.

The heating apparatus of the present invention may be used with gaseous fuels having a vapor pressure greater than one atmosphere at room temperature (i.e., 20° C.), such as for example, methane, ethane, propane and butanes, and olefines such as propylene and butenes and mixtures thereof. Commercially available fuels such as natural gas, town gas, liquefied natural gas, liquefied petroleum gases and various waste hydrocarbon gases are suitable as well including mixtures thereof. The present invention is also applicable to vaporizable liquid hydrocarbon fuels (i.e., liquid fuels which may be formed into fine droplets) such as kerosene. Permanent gas fuels may also be used, such as hydrogen, which may be diluted with an inert gas such as nitrogen to control the temperature of combustion.

Referring now to the drawings, and particularly FIGS. 10–16, embodiments of a heater assembly in accordance with the present invention is shown. A fuel such as propane is supplied under pressure from a fuel canister to a combustion chamber containing a catalyst substrate. An electrical ignition device ignites the fuel, while a fuel valve regulates the flow of fuel. The fuel reacts with oxygen in the presence of the catalyst under conditions and in a manner where heat is generated while eliminating, or at least minimizing, the presence of harmful by-products arising from incomplete combustion of the fuel. A fan draws outside air into the encasement and forces the air around the heating apparatus, drawing hot air away from the surface of the catalyst-containing substrate. The heating apparatus is explained in detail with reference to FIGS. 1–9.

The FIG. 1 illustrates a portable heating apparatus coupled to a fuel canister containing a fuel in a form suitable for efficient reacting with oxygen to generate heat. The term "fuel" shall include gaseous fuels (e.g., propane), vaporizable fuels such as kerosene, and mixtures thereof. The heating apparatus 10 generally includes a housing 8 defining a combustion chamber 16 therein (see FIG. 2). It should be noted that the housing 8 may be in a variety of shapes, including the shape of a cylinder, a rectangular solid and the like. Other shapes and sizes may be utilized depending on the application as will be recognized by one of ordinary skill in the art.

The combustion chamber 16 includes an outlet 17, and an inlet in fluid communication with a fuel canister 12 through a regulator valve assembly and a fuel-air mixing assembly as will be described hereinafter. A substantially cylindrical collar 14 with a wider portion at the end opposite from the fuel canister 12, is included for housing the regulator valve and fuel-air mixing assemblies. A knob 30 is connected to the regulator valve assembly for regulating the flow rate of fuel from the fuel canister 12 into the combustion chamber 16, as will be described hereinafter. A heat shield 24 may be optionally provided between the collar 14 and the housing 8 to prevent the transmission of heat from the housing 8 to the other components of the apparatus 10.

The housing 8 includes a gas permeable head screen 18 and a head pan 20. The head screen 18 encloses the outlet 17 to reduce the potential for serious skin burns. In addition, the head screen 18 physically protects components within the combustion chamber 16. The head screen 18 may comprise a mesh or a plurality of holes or other openings. In an exemplary embodiment, approximately 80% of the area of the head screen is open. The head screen 18 and the head pan 20 are securely fastened together by an annular clamp 22 that extends along the respective common peripheries for forming a gas-tight seal therebetween. A catalyst-containing substrate 32 is disposed in the combustion chamber 16 between the head screen 18 and the head pan 20.

The introduction of the fuel-air mixture into the housing 8 under pressure and in a uniform fashion dramatically improves the operation of the heating apparatus 10 at various angles and orientations. With little effect on overall performance, the apparatus 10 can effectively operate in a vertical position resting on a base portion 28 of the fuel canister 12 or at a position such as 45° from vertical while supported by a leg stand 26.

Figure 2:
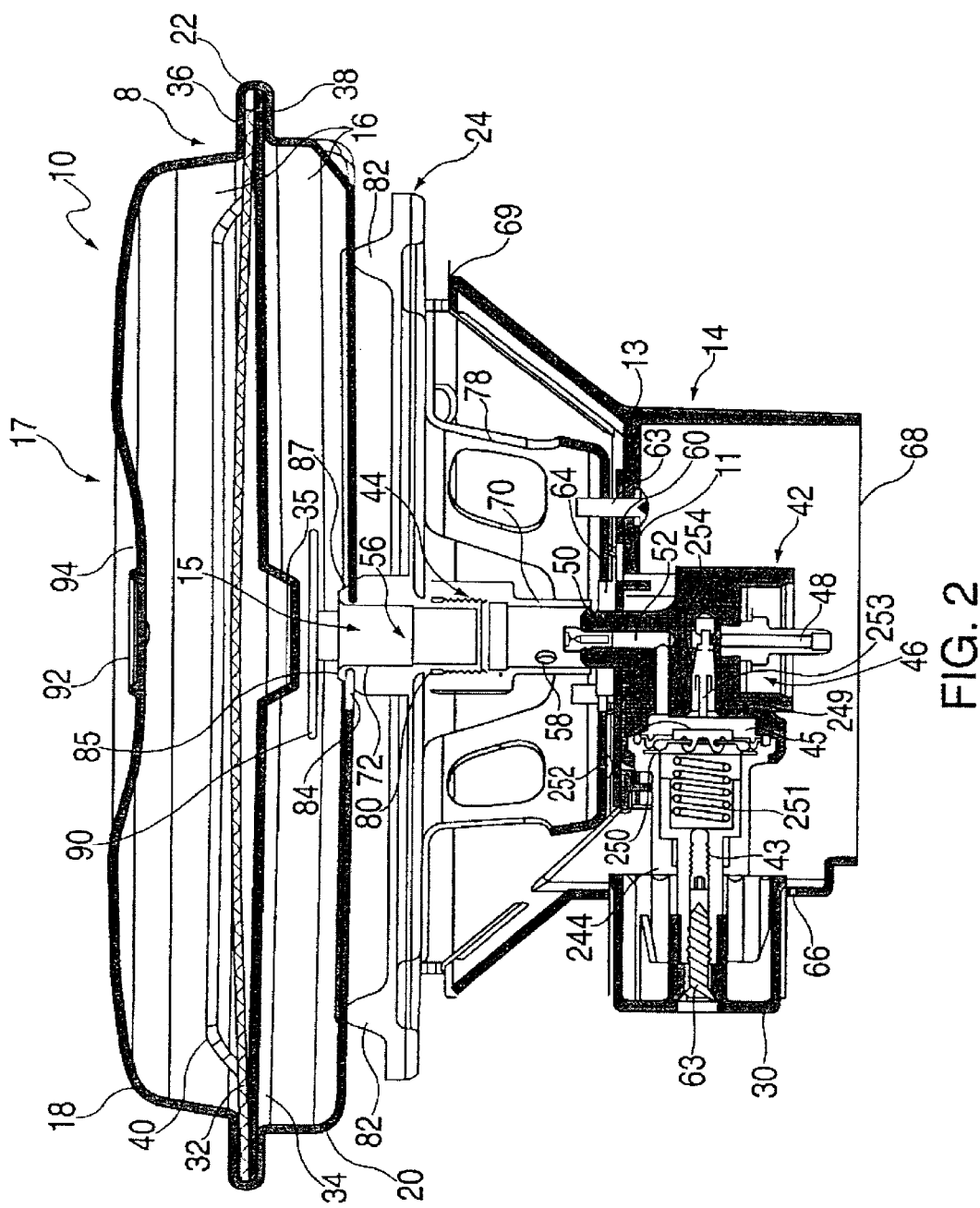
FIG. 2 is a side cross-sectional view of the heating apparatus of FIG. 1.

Referring to FIG. 2, the fuel is introduced into the lower portion of the combustion chamber 16 in the housing 8 via a regulator valve assembly 42 and a fuel-air mixing assembly 44. An inlet port 46 of the regulator valve assembly 42 is configured for receiving and coupling with a fuel supply device such as the fuel canister 12 shown in FIG. 1. The pressurized fuel is introduced into the inlet port 46 through an inlet tube 48, which extends into the regulator valve assembly 42. A fuel regulator assembly 249 is provided at the end of the inlet tube 48 for regulating the fuel flow through the regulator valve assembly 42 in accordance with the position of the adjustable knob 30 attached thereon, as will be described hereinafter. As the regulated fuel passes through the fuel regulator assembly 249, it exits the regulator valve assembly 42 through an outlet tube 52 in an outlet port 50 which extends into the fuel-air mixing assembly 44.

The fuel-air mixing assembly 44 is defined by an elongated tubular member comprising upper and lower tubes 72 and 70, respectively. It should be noted that the tubes 72, 70 of the fuel-air mixing assembly 44 may be of a unitary structure for ease of assembly. The elongated tubular member includes a bore 56 in communication with the outlet port 50 of the regulator valve assembly 42 at one end and the inlet 15 of the combustion chamber 16 at the other end. During operation, as fuel under pressure flows rapidly through the bore 56, a low-pressure gradient is produced therein relative to the ambient air pressure. An opening 58 in the lower tube 70, proximate to the regulator valve assembly end of the fuel-air mixing assembly 44 admits ambient air into the fuel stream, i.e., air is drawn into the low pressure area of the fuel stream for mixing therewith. More than one opening 58 may be included. The size of the opening 58 and the diameter of the bore 56 are proportioned such that a specific amount of primary air is mixed with the fuel. Depending on the fuel consumption rate and the heat output of the heater, approximately 10 to 20% (preferably 10–15%) of the air required for proper stoichiometric fuel-air combustion is preferably introduced through the opening 58 into the fuel stream. The remaining 80–90% of the combustion air is drawn as secondary air at the head of the heater 10. By limiting the amount of primary air intake to the above-specified range, the risk of experiencing an explosive build-up of primary air in the lower portion of the combustion chamber 16 is eliminated or at least substantially minimized. In addition, the emission levels of harmful combustion by-products are further kept to a minimum.

Fuel and air entering the housing 8 into the lower portion of the combustion chamber 16 are radially diffused from the center by a diffuser plate 90, which is preferably circular (see also FIG. 5), mounted above the inlet 15. The purpose of the diffuser plate 90 is to ensure a thorough mixing and blending of the primary air with the fuel in the combustion chamber 16 and to facilitate a uniform flow of the fuel-air mixture through the catalyst-containing substrate 32 over the entire area thereof. A uniform fuel-air mixture flow ensures an efficient and complete combustion and prevents hot spots from developing on the surface of the catalyst-containing substrate 32. Hot spots shorten the operating life of the catalyst-containing support 32, degrade the catalyst, result in incomplete combustion, and decrease the overall efficiency of the apparatus 10.

As the uniform fuel-air mixture permeates throughout the combustion chamber 16, the mixture flows through an inner screen 34. The inner screen 34 provides a base support for the porous catalyst-containing substrate 32 to preserve its substantially planar shape and prevent any distortions, e.g., center portion bowing downwardly. A deformed catalyst-containing support 32 creates hot spots in the surface thereof which can degrade overall performance and operating life of the apparatus 10. A centrally-located, generally circular depression 35 in the inner screen 34 extends downwardly towards the top surface of the diffuser plate 90. During operation, the circular depression 35 acts as a thermal conductor for transmitting heat from the catalyst-containing substrate 32 to the diffuser plate 90. The heated diffuser plate 90 in turn acts as a heat exchanger for heating the incoming fuel-air mixture, which slightly raises the pressure gradient in the combustion chamber 16 for total saturation of the catalyst-containing substrate 32. An increase in gas pressure further facilitates the uniform distribution and flow of the fuel-air mixture along the entire length of the catalyst-containing substrate 32, even when the apparatus is oriented at an angle such as 45° from vertical.

The catalyst-containing substrate 32 is a woven fabric-like ceramic pad composed of materials such as aluminum silicon, zirconia, titania, silica and alumina and mixtures thereof that is porous for facilitating gas diffusion and refractory for resisting the heat accompanying combustion. The catalyst-containing substrate 32 further includes a catalyst material composed of a noble metal such as platinum and compounds thereof which facilitates the oxidation of the fuel-air mixture to generate a flameless combustion.

As the uniform fuel-air mixture flows into the catalyst-containing substrate 32, the balance of the ambient air, or secondary air, required for complete combustion circulates throughout the surface of the catalyst-containing substrate 32. There the uniform fuel-air mixture is oxidized by the catalyst-containing substrate 32 for a clean and efficient reaction.

A more detailed view of the fuel-air mixing assembly 44 is shown in FIGS. 3A through 3C. As described above, the fuel-air mixing assembly 44 is a tubular member, preferably having a circular cross-section, comprised of a lower tube 70 connected to an upper tube 72, such as by threaded engagement. The bore 56 is cylindrically shaped for permitting fuel to flow therethrough. Radially directed openings 58 are provided in the surface of the lower tube 70 for drawing ambient air therein for mixing with the fuel stream. The length of the fuel-air mixing assembly 44 should be such that thorough mixing and blending of the fuel and the air can be achieved.

Figure 4A:
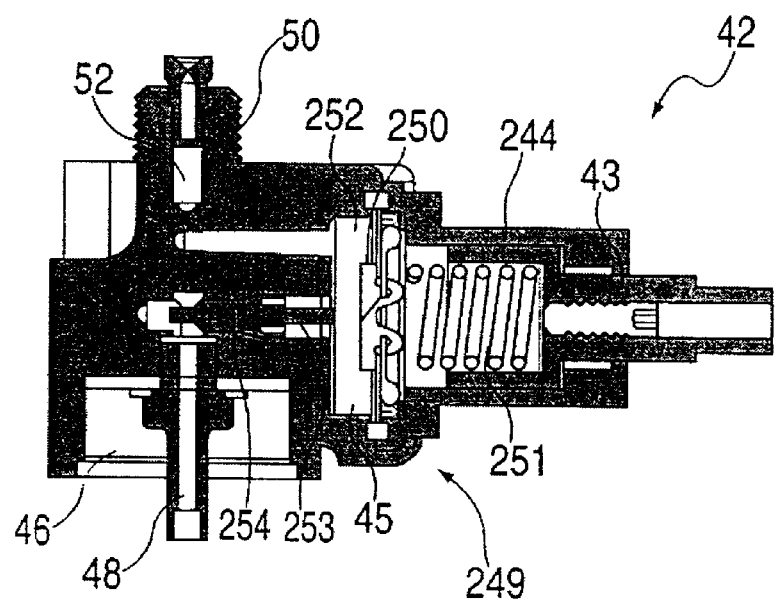
FIG. 4A is an enlarged cross-sectional elevational view of one embodiment of a regulator valve assembly for use in the present application.

Referring to FIG. 4A, an enlarged side cross-sectional view of the regulator valve assembly 42 is shown in greater detail. The regulator valve assembly 42 regulates the fuel flow into the heating apparatus 10. As mentioned above, the regulator valve assembly 42 primarily includes an inlet port 46, an outlet port 50, and the fuel regulator assembly 249 attached to the knob 30. The inlet port 46 is configured for receiving fuel from the fuel canister 12 as described above, and the outlet port 50 is fluidly coupled to the fuel-air mixing assembly 44 for discharging the fuel therein.

The fuel regulator assembly 249 includes a valve core 254 coupled with the inlet tube 48. The valve core 254 opens and shuts the regulator valve assembly 42 for regulating the fuel flow rate. A stem 253 slidably connected to the valve core 254 triggers the opening and shutting of the valve core 254. The fuel regulator assembly 249 further includes a diaphragm assembly 250 disposed within the regulator valve assembly 42 proximate the valve core 254. The diaphragm assembly 250 is composed of a flexible material customarily employed for diaphragms such as rubber, elastomer, latex, polypropylene, and the like that permits back and forth movement in relation to the stem 253 and the valve core 254. A member 252 typically in the shape of a button is disposed in the diaphragm assembly 250 for engagement with the valve core stem 253 when a pressure is applied against the diaphragm assembly 250. An actuator 43 connected to the knob 30, radially engages a cam collar 244. As the actuator 43 is radially turned, the actuator 43 slides back and forth in response to the cam profile (see FIG. 4B and the description hereinafter) of the cam collar 244. This sliding movement of the actuator 43 causes the tension in a spring 251 to vary as it presses against the diaphragm assembly 250 for operative engagement with the valve core 254. The higher the spring tension, the greater the rate of fuel flow through the valve core 254.

The regulator valve assembly 42 further provides a pulsating fuel flow to the heating apparatus 10. With the diaphragm assembly 250 spring-biased against the stem 253 during operation, the valve core 254 opens for permitting fuel to flow therethrough. The flowing fuel overcomes the spring pressure and the diaphragm assembly 250 is temporarily displaced off of the valve core stem 253, causing the valve core to close. With the valve core 254 thus closed, the pressure in the chamber 45 subsides and the diaphragm assembly 250, biased by the spring 251, presses against the valve core stem 253 once again, causing it to open. This pattern produces a continuous oscillation of the diaphragm assembly 250 that results in the pulsing of the fuel flow. The amount of fuel associated with each oscillation is dependent at least in part on the tension of the spring 251. The pulsing action provides an added benefit of aiding in the mixing of the fuel-air mixture primarily in the fuel-air mixing assembly 44.

Figure 4B:
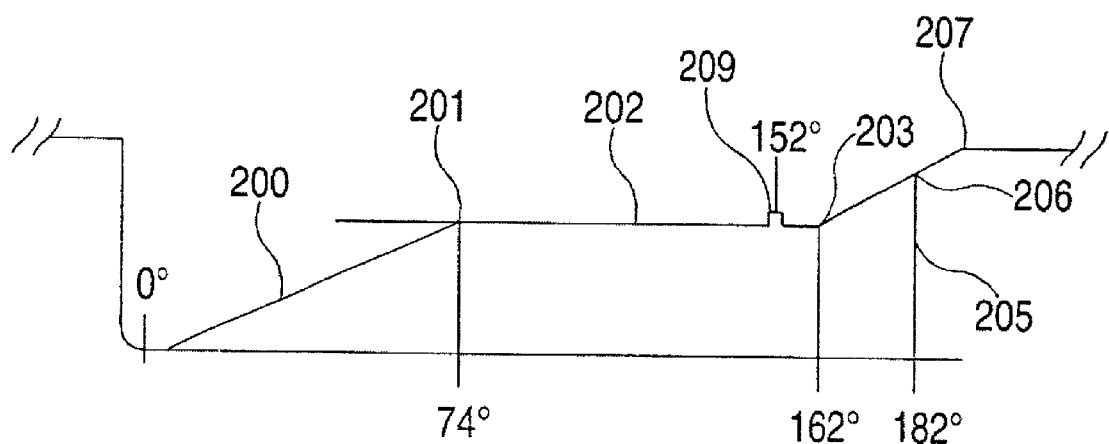
FIG. 4B is a graphical representation of fuel flow rates relative to a cam profile of a cam collar of an exemplary regulatory valve assembly.

Referring to FIG. 4B, a graphical representation of fuel flow rate relative to the cam profile of the cam collar 244 is shown. The regulator valve assembly 42 operates in three principal stages, one of which is transitory for providing maximal fuel flow during ignition, and referred to as the IGNITE stage. The other two positions include OFF and ON. At 0°, the regulator valve assembly 42 is in the OFF position, which is characterized by the closure of the valve core 254, and the absence of fuel flow. In this position, the actuator 43 is at its furthest point away from the diaphragm assembly 250 and the tension of the spring 251 is thus at its lowest.

As the actuator 43 is rotated along the cam collar 244 from 0° to a first activation position 201 (e.g., about 74°), the actuator moves inward linearly, as shown by a ramp segment 200, with the tension of the spring 251 increasing accordingly and the valve core 254 opening accordingly. Beyond the first position 201, the fuel flow rate remains substantially constant as the actuator is rotated (through the horizontal ramp segment 202) to a second position 203. The ramp segment 202, between about 74° and about 162°, represents the ON stage in which the valve core 254 is open sufficiently (e.g., 75% of capacity) for providing normal operating fuel flow.

To advance to the IGNITE stage, the actuator 43 is turned beyond the ON stage to a third activation position 206 (e.g., about 182°). At the position 206, the valve core 254 is open at an increased capacity for permitting additional fuel flow therethrough. The increased fuel flow rate facilitates the ignition of the combustion reaction in the heating apparatus 10. Once the apparatus 10 is ignited, the user releases the knob 30 and the actuator 43 being biased by the spring 251, rotates back to the ON stage for restoring the fuel flow to the normal operating rate.

Stopping features (not shown) arranged on the actuator 43 and collar 244, in a known way, prevent the actuator from advancing beyond the position 206. As shown in FIG. 4B, position 206 is located along an inclined ramp 205. By thus locating the position 206 along an incline, it is ensured that the actuator 43, under the biasing force of the spring 251, will rotate back down to the ON position when the knob 30 is released.

A hump 209 is provided on the cam profile of the collar 244 at a position on the ramp segment 202 (e.g., about 152°) to prevent the actuator 43 from turning beyond the ON stage without user intervention. As such, once the heater has been lit and the user releases the knob 30 from the IGNITE position, the actuator 43 rotates back to the ON stage and is captured between the hump 209 and the position 203. To turn the heater off, the user rotates the actuator 43 over the hump 203, across the ramp segment 202 and down the ramp segment 200, back to the OFF position.

Figure 5:
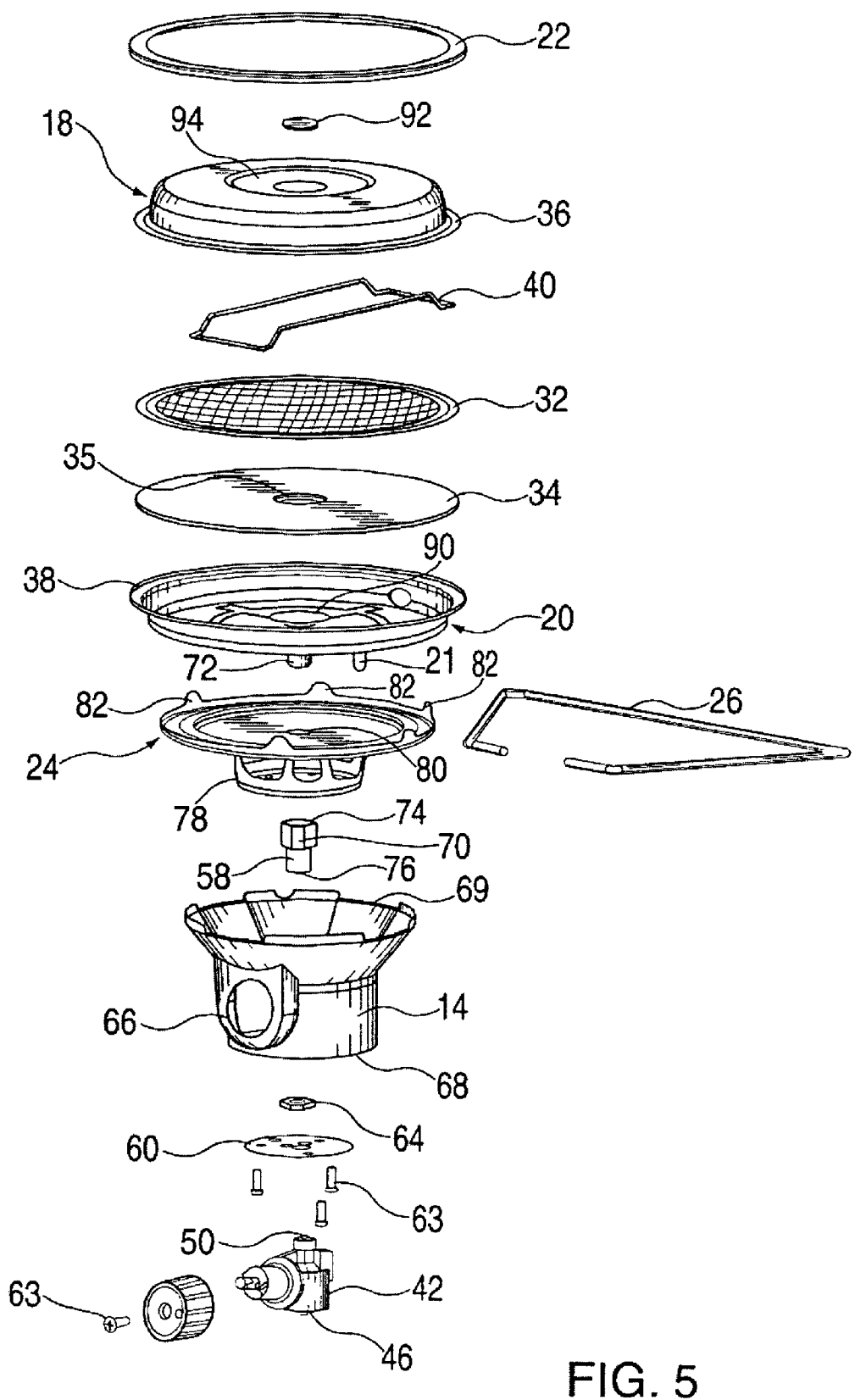
FIG. 5 is an exploded view of an embodiment of the heating apparatus of the present invention.

Referring to FIG. 5, an exploded view of an exemplary embodiment of the heating apparatus 10 of the present invention is shown. The regulator valve assembly 42, including the internally threaded inlet port 46, the externally threaded outlet port 50 and the actuator 43, is coupled with a regulator plate 60 through a centrally located hole 62 and secured therewith by a nut 64 threadedly engaged to the outlet port 50. The regulator plate 60 and regulator valve assembly 42 are inserted through a bottom opening 68 of the collar 14 and mounted to a partition 13 with a centrally located partition hole 11 (see FIG. 2). The regulator valve assembly 42 is oriented with the end of the actuator 43 visible through an opening 66 in the collar 14. The knob 30 is then securely affixed to end of the actuator 43 such as with a screw 63. The outlet port 50 of the regulator valve assembly 42 partially extends through the partition hole 11.

A lower tube 70 having an internally threaded top end 74 with a nut-shaped exterior, and a bottom end 76, is inserted through a top opening 69 in the collar 14. The bottom end 76 of the tube 70 is fluidly coupled with the outlet port 50 of the regulator valve assembly 42. A cylindrical bracket 78 extending from the bottom of the heat shield 24 is inserted through the top opening 69 and mounted with the collar partition 13. Three screws 63 are inserted through the bottom opening 68 in the collar 14 to tightly secure the regulator plate 60 and the bracket 78 to the partition 13.

As shown in FIGS. 3A and 3B, an upper tube 72 having a flange 85 extending around the opening at the top end 86 and an externally threaded bottom end 88, is inserted through a centrally located hole 84 in the head pan 20 (see FIG. 2). The flange 85 abuts against an edge portion 87 of the hole 84 for retaining the upper tube 72 therein and for forming a gas tight seal therebetween. The head pan 20 is placed on top of a plurality of support tabs 82 extending along the periphery of the heat shield 24. The bottom end 88 of the upper tube 72 extends through the hole 80 in the heat shield 24. The bottom end 88 is then screwed into the top end 74 of the lower tube 70 for fluid communication therebetween and for securely retaining the head pan 20 to the top of the heat shield 24. A lock tab 21 is provided under the head pan 20 for fitting engagement with a slot (not shown) in the heat shield 24. The lock tab 21 serves to immobilize the assembled housing 8, heat shield 24, and the upper tube 72 together for secure engagement. For increasing the support and stability of the heating apparatus 10, the triangular leg stand 26 is pivotally attached to the bottom portion of the heat shield 24 by the ends thereof.

Referring again to FIG. 5, the diffuser plate 90 is mounted to a top surface of the head pan 20 at a distance over the opening in the top end 86 of the upper tube 72. The head pan 20 further includes a flange portion 38 extending along the rim thereof. A permeable inner screen 34 is placed in the head pan 20 supported along the flange portion 38 thereof. A woven fabric-like catalyst-containing substrate 32 is placed on top of the inner screen 34. A holder 40 is placed transversely across the top of the catalyst-containing substrate 32 for secure retention. The head screen 18 having a flange portion 36 extending along the rim thereof, is then placed on top of the head pan 20 for containing the holder 40, the catalyst-containing substrate 32, and the inner screen 34. The annular clamp 22 secures the respective flange portions 38 and 36 of the head pan 20 and head screen 18 together for secure retention and gas-tight seal therebetween. Accordingly, the retained head screen 18 and head pan 20 in combination, hold the inner screen 34, catalyst-containing substrate 32 and support holder 40 in position within the combustion chamber 16.

A thermal indicator disc 92 may be provided in the center of a concave portion 94 of the head screen 18. Due to the low temperature combustion and flameless nature of the apparatus 10, there is no visual indication of heat when the apparatus is operating. A user who touches the head screen 18, not knowing whether the apparatus 10 is operating or not, could potentially incur severe burns. The thermal indicator disc 92 alerts such users to the operating status of the apparatus 10 and may thereby prevent potential injury. The thermal indicator disc 92 performs such a function by changing colors as the head screen 18 heats up to the operating temperature. Common for thermochromatic materials, the color scheme may be coordinated with various specific temperature gradients. For example, at ambient temperature the thermal indicator disc may be black. At 160–170° F., the color changes from black to red, and at the operating temperature of 200–300° F., a white sunburst mark appears in the red field. It should be noted that a wide variety of colors or words (e.g., red, orange; "Caution", "Hot") may be utilized to provide the user with a warning as to the operating status of the apparatus 10. In addition, other forms of thermal indicators employing mechanisms such as bimetallic material, for example, may be utilized for the purposes described above.

In an exemplary embodiment of the present invention, the heater apparatus 10 provides about 3,000 BTU of heat with a fuel flow rate range of about 75 to 82 cubic centimeters per minute. The air opening 58 in the fuel air-mixing assembly 44 is about 0.14 inches in diameter and the cross-sectional diameter of the fuel-air mixing assembly 44 is about 0.5 inches. The housing 8 has a cross-sectional diameter of about 8 inches with the surface of the head screen 18 radiating about 72 BTU per square inch. The carbon monoxide emission characteristic of this embodiment of the heating apparatus 10 is about 15 parts per million, even in a reduced oxygen environment. This is compared to 80 to 150 parts per million of carbon monoxide generated by a prior art catalytic combustion apparatus and 30 to 35 parts per million of carbon monoxide generated by a typical lit cigarette. It is noted that the measurements provided herein are not meant to be limiting and provide only one example of a preferred embodiment of the invention.

Figure 6A:
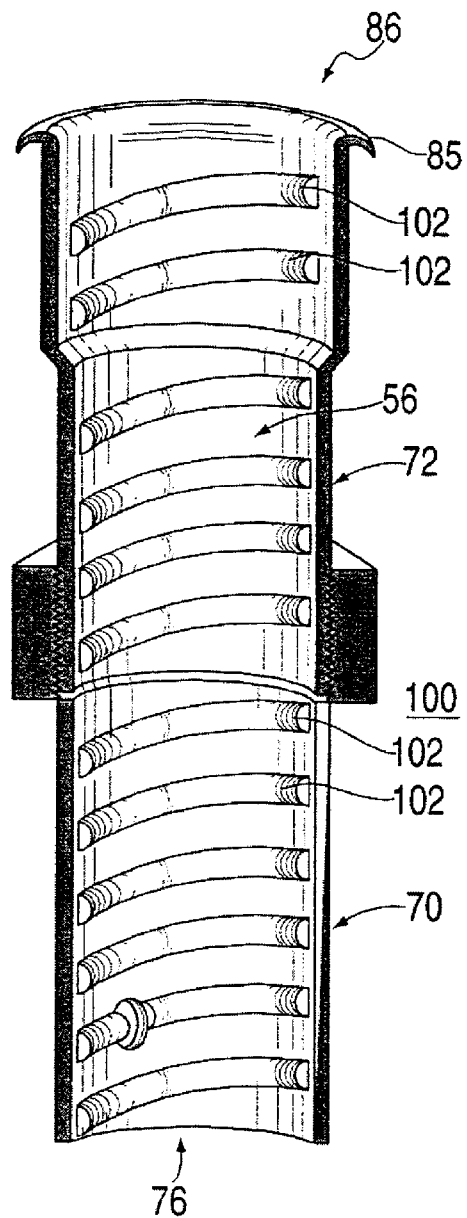
FIG. 6A is an enlarged cross-sectional elevational view of another embodiment of a fuel-air mixing assembly with a helical structure disposed within the interior thereof.

A modified fuel-air mixing assembly is shown in FIG. 6A. The modified fuel-air mixing assembly 100 is comprised of a unitary tubular member with a helical structure 102 disposed within the interior. Other components and functional aspects of the fuel-air mixing assembly 100 are essentially the same as the fuel-air mixing assembly 44 previously described. The fuel-air mixing assembly 100 includes projections formed from the helical structure 102 within the bore 56 of the fuel-air mixing assembly 100, which create an improved mixing effect therein by imparting a turbulent flow of the air and fuel throughout the bore 56.

Figure 6B:
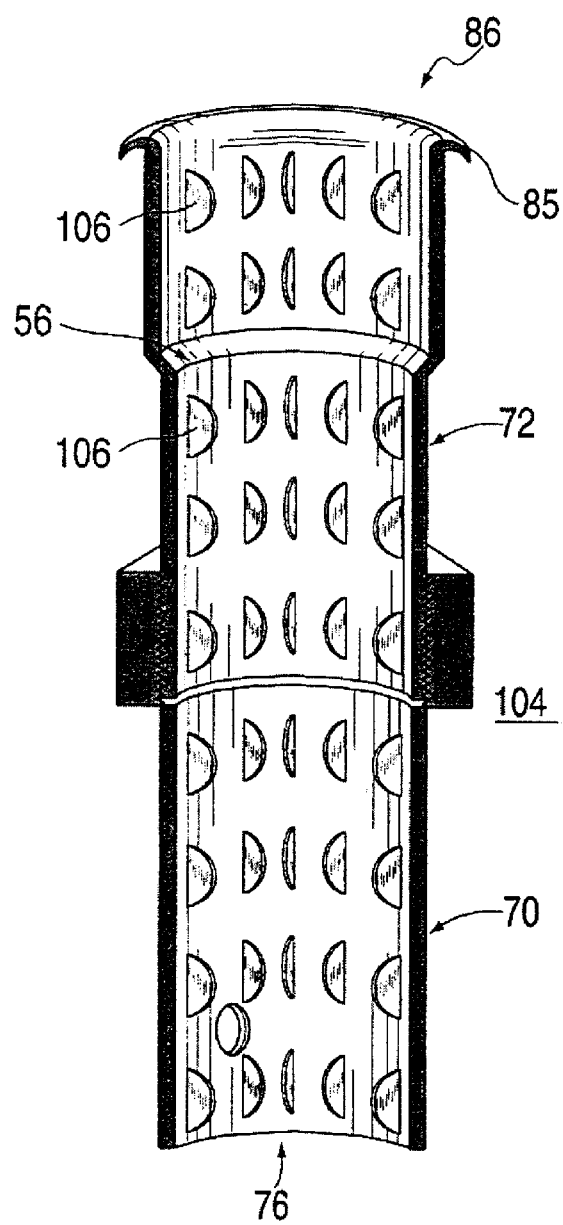
FIG. 6B is an enlarged cross-sectional elevational view of a further embodiment of a fuel-air mixing assembly with a plurality of fin-like structures affixed to the interior side walls thereof.

Another embodiment of a fuel-air mixing assembly 104 is shown in FIG. 6B which includes fin-like projections 106 adapted for the purpose of inducing turbulent flow of the fuel and air for providing a desirable uniform fuel-air mixture.

Figure 7A:
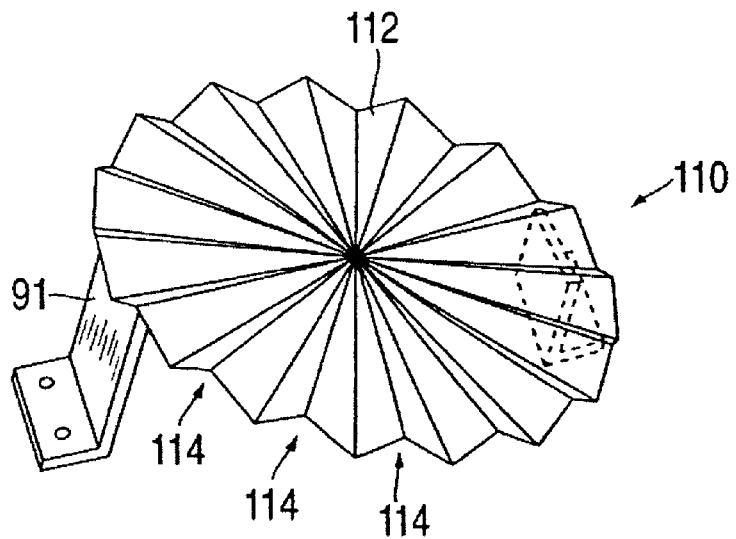
FIG. 7A is a perspective view of a modified diffuser plate for use in the present invention.
Figure 7B:
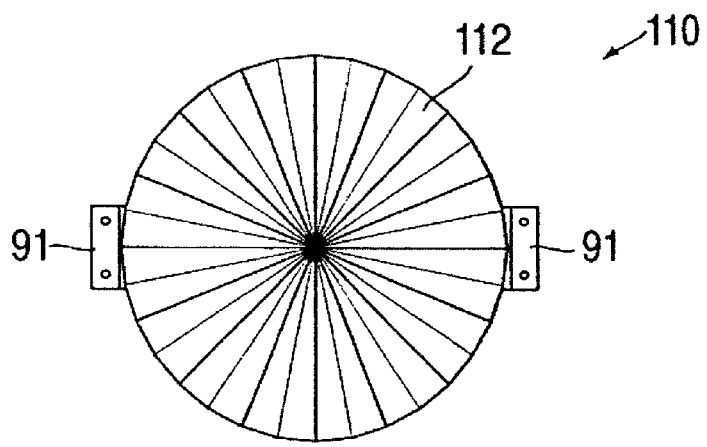
FIG. 7B shows a top plan view of the diffuser plate shown in FIG. 7A.
Figure 7C:
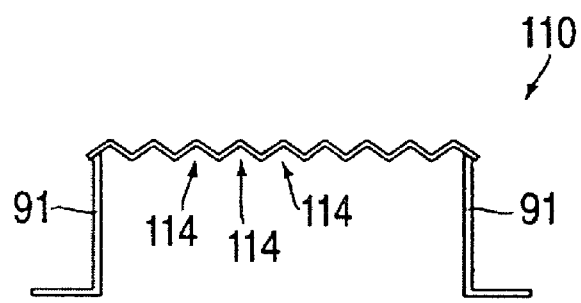
FIG. 7C shows a side elevational view of the diffuser plate shown in FIG. 7A.

As shown in FIGS. 7A through 7C, respectively, a modified diffuser plate 110 may be employed. The modified diffuser plate 110 includes a circular radially corrugated body 112 mounted to the head pan 20 by a pair of braces 91 over the chamber inlet 15. The corrugated body 112 includes a plurality of radially directed channels 114 along the lower surface thereof. The channels 114 provide for an improved uniform distribution of the fuel-air mixture within the combustion chamber 16 toward the catalyst-containing substrate 32.

Figure 8:
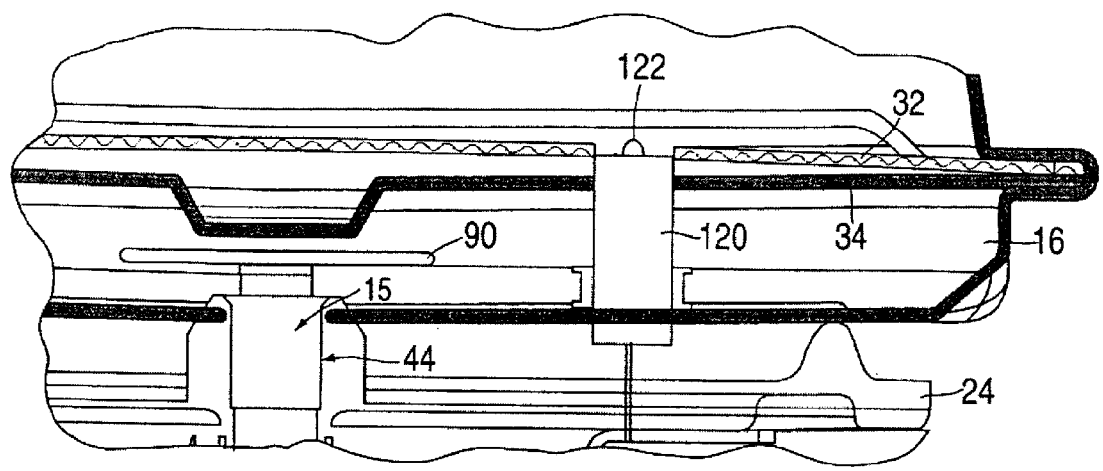
FIG. 8 is a partial cross-sectional view of an ignition assembly for use in the present invention.

In a further embodiment of the present invention as shown in FIG. 8, the combustion chamber 16 includes an electrical ignition device 120 with one end mounted to the head pan 20 and the other end having a spark emitting electrode tip 122, extending through the inner screen 34 and the catalyst-containing substrate 32. The ignition device 120 provides the user with a simple method of initiating a self-sustaining combustion reaction for generating heat. As the actuator 43 of the regulator valve assembly 42 is turned to the IGNITE position (see FIG. 4B), an initial large quantity of the fuel-air mixture is introduced into the combustion chamber 16 and thereby diffuses quickly through the catalyst-containing substrate 32. As the ignition device 122 is activated, a spark or series of sparks is created at the electrode tip 122 to ignite the denser than usual fuel-air mixture. It should be noted that the ignition device is not limited to the form described above and may include other forms such as electric, flame, and the like as known by one of ordinary skill in the art.

Figure 9A:
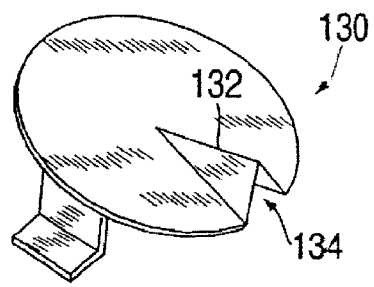
FIG. 9A is perspective view of another embodiment of a diffuser plate for use in the present invention.
Figure 9B:
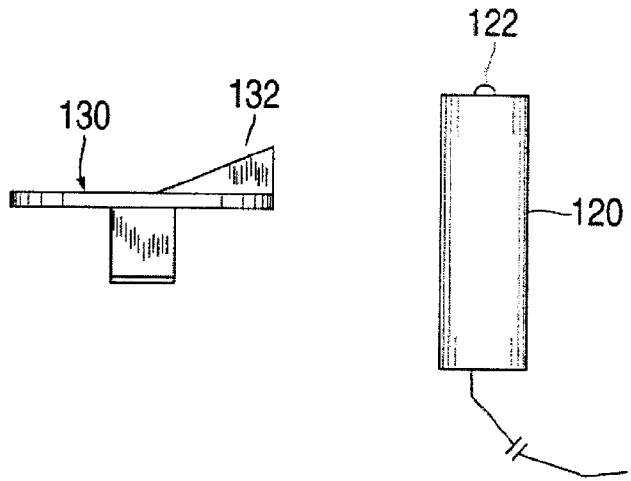
FIG. 9B is a side elevational view of the diffuser plate shown in FIG. 9A in position relative to the ignition device.

In addition to the use of the ignition device 120, a modified diffuser plate 130 may be optionally included in the combustion chamber 16 as shown in FIGS. 9A and 9B. The diffuser plate 130 is similar in design to the diffuser plate 90 shown in FIGS. 2 and 8. However, the diffuser plate 130 includes an upwardly sloping ridge extending from the center to the edge of the diffuser plate 130 for forming a trough 134 in the undersurface portion thereof as shown in FIG. 9A. In mounting the diffuser plate 130 on the heat pan 20, it is preferable to orient the trough 134 towards the electrode tip 122 of the ignition device 120 as shown in FIG. 9A. Initially, during ignition, the trough 134 provides a more focused fuel-air mixture flow towards the ignition device 120 for a faster ignition.

Figure 10:
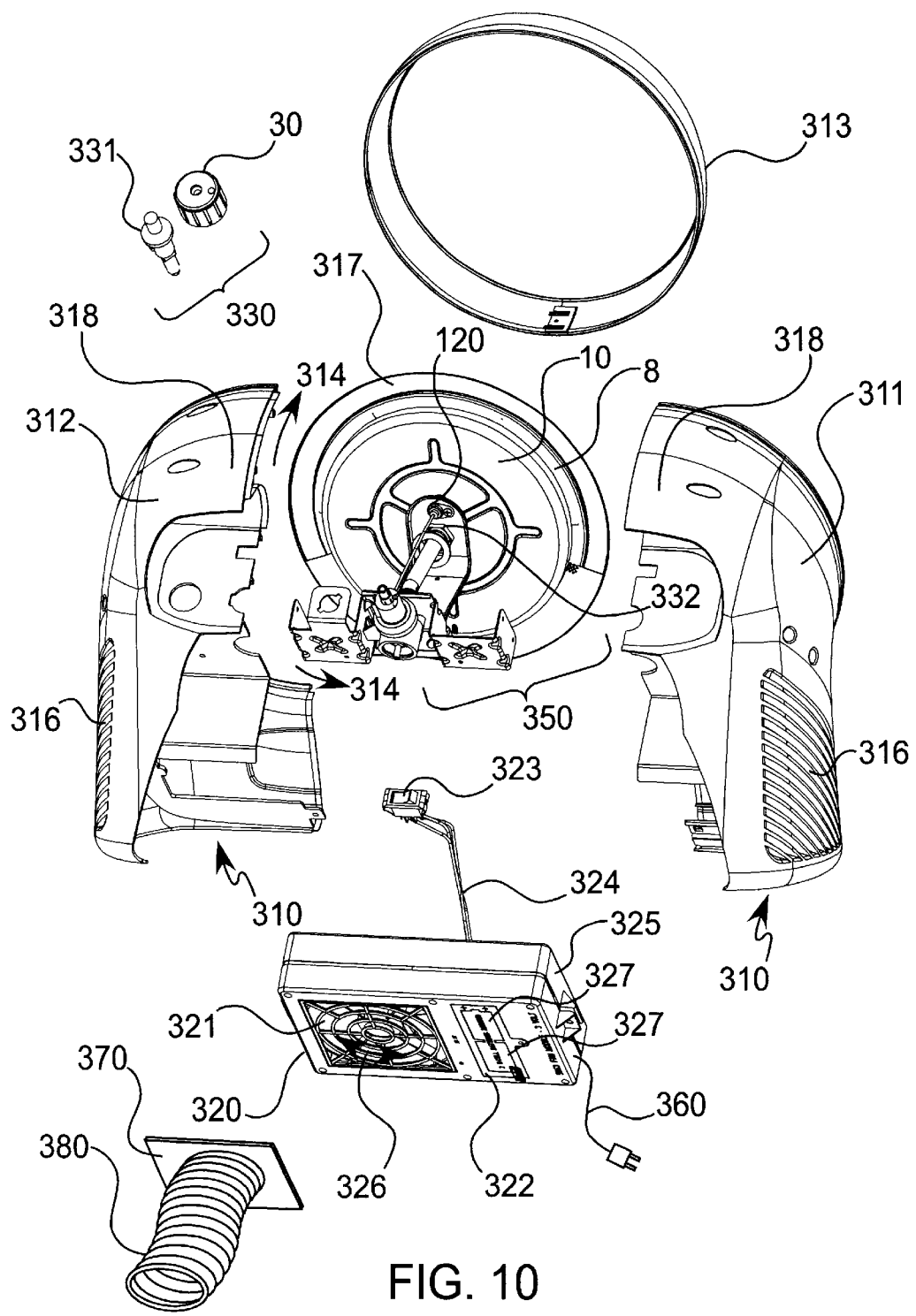
FIG. 10 is an exploded view of an exemplary embodiment of a heater assembly of the present invention.

The heating apparatus 10, as described and depicted in FIGS. 1–9, may also be incorporated, with some modifications, into exemplary embodiments of a portable heater assembly 300, as shown in FIGS. 10–17. Referring to FIG. 10, an exploded view of an exemplary embodiment of the heater assembly 300 is shown. Heater assembly 300 may include an encasement 310, a fan module 320, an electrical ignition assembly 330, power controls 340, a modified heating apparatus 350, and a fuel canister 12.

Encasement 310 may include left and right halves 311 and 312, respectively, and a bezel rim 313. Left and right halves 311 and 312 may have lip portions 318 towards a top of the encasement which meet to form a handle. The encasement 310 supports and encases the fan module 320, the electrical ignition assembly 330, the power controls 340, and the modified heating apparatus 350, including the regulator valve assembly 42 connecting to the fuel canister 12. Encasement 310 also includes air channels 314 (depicted in FIG. 11) leading from the fan 321 to the perimeter of housing 8 and head screen 18 of modified heating apparatus 350.

The fan module 320 may include a fan 321, a battery pack 322, an electric switch 323, and electrical wiring 324. The fan module may also include a fan module housing 325, or the housing of the fan module 320 may be subsumed in the encasement 310. The electric switch 323 activates the fan 321 by forming a closed electrical circuit within electrical wiring 324 between the battery pack 322 and the fan 321. The battery pack 322 may hold an electrical power storage device, such as replaceable batteries 327.

The battery pack 322 optionally may include a battery recharger (not shown) having a recharger outlet (not shown) into which a power cord 360 plugs, as is known in the art. The power cord 360 may then be plugged into an electrical socket (not shown) of a building to recharge the battery pack 322. Alternatively, the battery pack 322 may be replaced with an affixed power cord 360.

The fan 321 may draw in outside air from around the encasement 310, as well as through the encasement 310 at vents 316. Vents 316 help to equalize the pressure within the encasement 310 and behind the fan 321 by facilitating airflow to the fan 321. The encasement 310 channels the forced air from the fan 321 through air channels 314 and around the perimeter of the modified heating apparatus 350. As the bezel rim 313 wraps around the left and right halves 311, 312 of encasement 310, the bezel rim 313 supports a perforated screen 317, arranged around the head of the heating apparatus 350, through which the air escapes the encasement 310. Expelling the air around the perimeter of the modified heating apparatus 350 avoids blowing the forced air directly into the catalyst-containing combustion chamber 16, which would interfere with the fuel-air mixture.

In addition, a covering 370 having an attached hose 380 may cover an air intake portion 326 of the fan module 320, causing the fan 321 to draw air through the hose. An end of the hose not attached to the covering may be placed away from the heater assembly 300 so as to draw air from farther away. For example, the end of the hose not attached to the covering may be attached to an opening in a tent wall (not shown), causing the fan 321 to draw air from outside the tent through the hose and expel the outside air through the encasement and into the tent. Attaching the hose to the tent wall would improve the ventilation in the tent and dilute the combustion exhaust generated by the heater assembly.

The electrical ignition assembly 330 may include electrical ignition device 120, spark-emitting electrode tip 122, ignition activator 331, and activator connector 332. Spark-emitting electrode tip 122 of electrical ignition device 120 protrudes through and is held against the catalyst-containing substrate 32 by a circular clamp 333. The electrical ignition assembly 330 may work in a manner substantially similar to the embodiment discussed with reference to FIGS. 8, 9A, and 9B. Electrical ignition assembly 330 may, for example, be a piezo ignition, a glow coil ignition, or another electrical ignition known in the art.

Spark-emitting electrode 122 may be a center conductor, which is the positive pole, surrounded by a cylindrical sheath 334 (shown in FIG. 11), which is the ground side of the circuit, within a tubular electrode. A tubular electrode holder 335 holds the tubular electrode through the body of the porous catalyst-containing substrate 32 so that the electrode is isolated from the fuel inside the head pan 20. The electrode tip 122 must be a slight distance to the catalyst-containing substrate 32 so that an electro-spark gap is present on the catalyst-containing substrate 32, igniting the fuel-air mixture as it permeates through the porous substrate 32.

Alternatively, electrical ignition assembly 330 may include a resistance wire 336 heated to high temperature by an electrical current. Resistance wire 336 may be electrically coupled by a wire 337 to an ignition switch 338 and a power source, such as battery pack 322. When the ignition switch is activated, the power source provides electricity to heat resistance wire 336, which when hot, ignites the fuel in head pan 20. Resistance wire 336 may be located in just below the catalyst-containing substrate 32 and may shaped, for example, as a circular coil parallel to substrate 32.

Power controls 340 may include knob 30 in connection with actuator 43, electric switch 323, and ignition activator 331. Modified heating apparatus 350 may include the heating apparatus 10 as described above, that may be modified, for example, to fit within encasement 310 and incorporate electrical ignition assembly 330.

Figure 11:
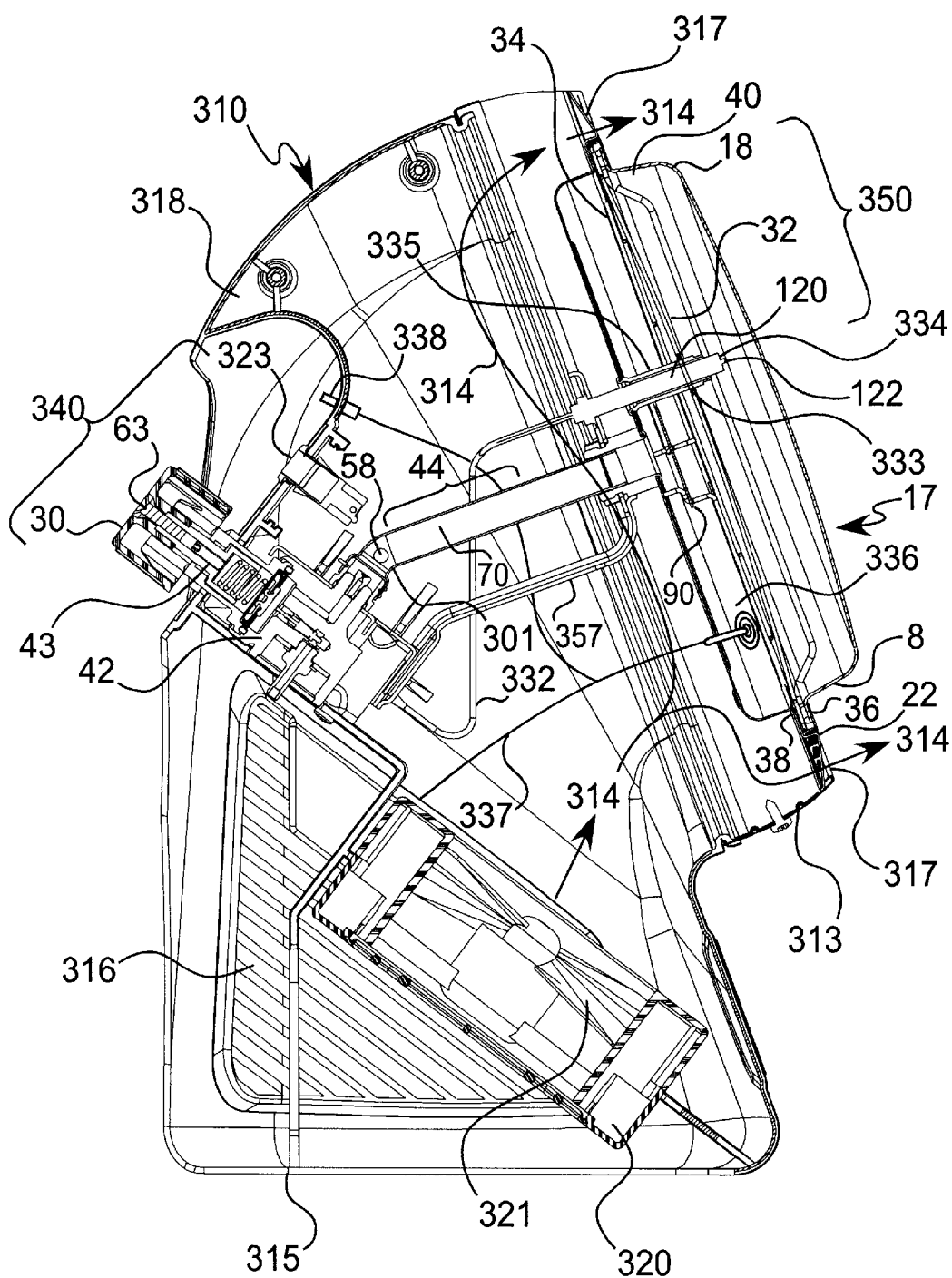
FIG. 11 is a side cross-sectional view of the heater assembly of FIG. 10.
Figure 17:
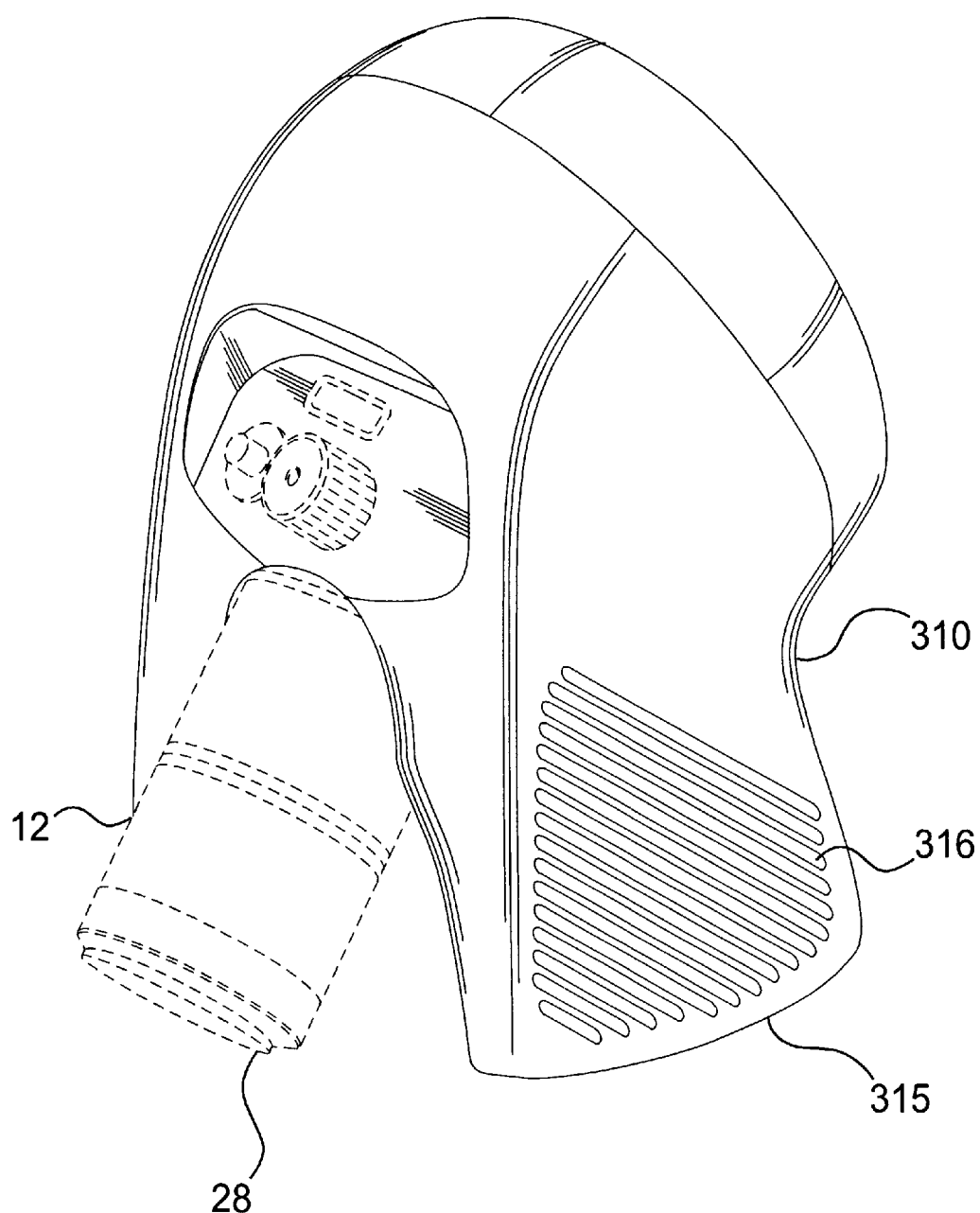
FIG. 17 is a rear perspective view of an exemplary heater assembly of the present invention.

A side cross-sectional view of portable heater assembly 300 of FIG. 10 is shown in FIG. 11. Encasement 310 is designed to stably distribute weight between the front and back, left and right. In anticipation that heater assembly 300 may be placed on the ground during operation, modified heating apparatus 350 may be angled backward slightly so as to channel hot air currents upward. Referring to FIG. 17, when fuel canister 12 is installed, the base portion 28 of fuel canister 12 rests in the same plane as the base 315 of encasement 310.

Figure 12:
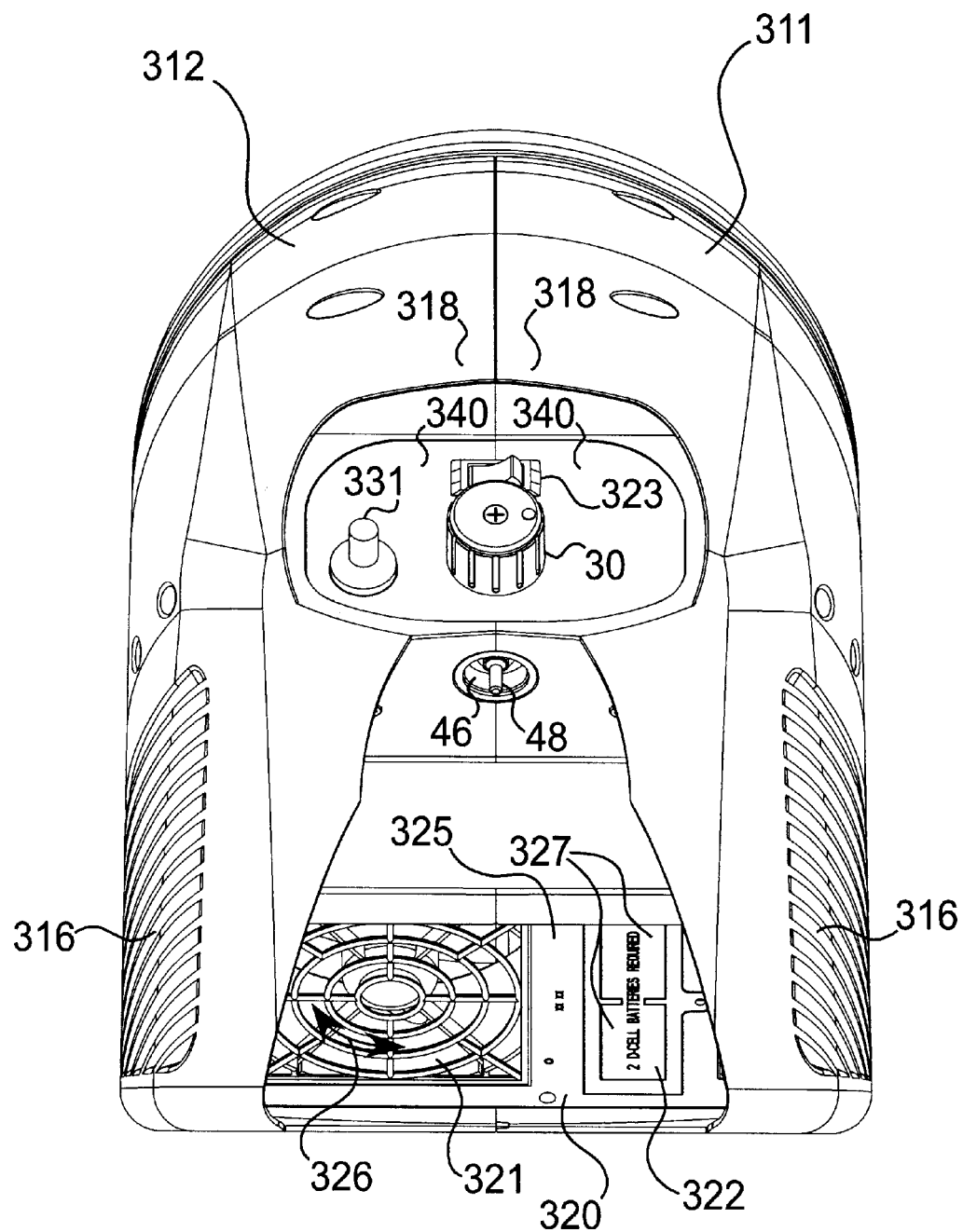
FIG. 12 is a rear perspective view of an exemplary heater assembly of the present invention.
Figure 13:
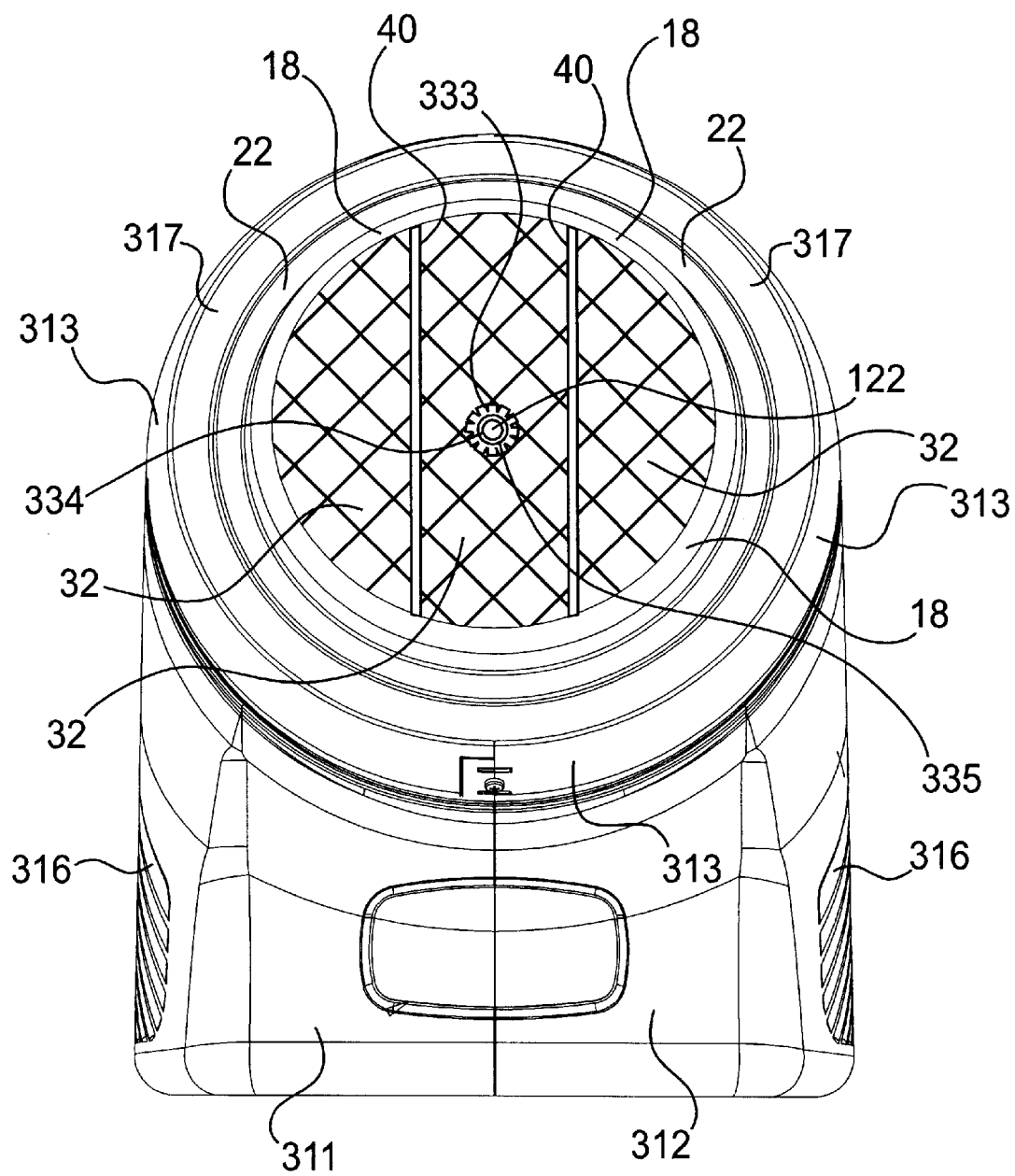
FIG. 13 is a front perspective view an exemplary heater assembly of the present invention.

A better understanding of heater assembly 300 may be had with further reference to FIGS. 12 and 13, which respectively are a rear elevation view and a front elevation view of exemplary heater assemblies of the present invention. Also, as shown in FIGS. 11 and 12, power controls 340 may be placed at the rear 315 of encasement 310, opposite the head of the modified heating apparatus 350, shown in FIG. 13, for ease of access as well as avoidance of the head of the modified heating apparatus 350 during operation. Fan module 320 may be placed beneath power controls 340, so as to provide easy access to power controls 340 while airflow to the fan module 320 remains unobstructed.

A comparison between FIG. 2 and FIG. 11 reveals that regulator valve assembly 42 remains substantially unchanged upon incorporation into heater assembly 300. However, in order to have power controls 340 and fuel canister 12 more vertically oriented, fuel-air mixing assembly 44 includes a bend 301 near opening 58 on lower tube 70. Also, lower tube 70 of fuel-air mixing assembly 44 is longer for better placement of power controls 340 within encasement 310.

Figure 14:
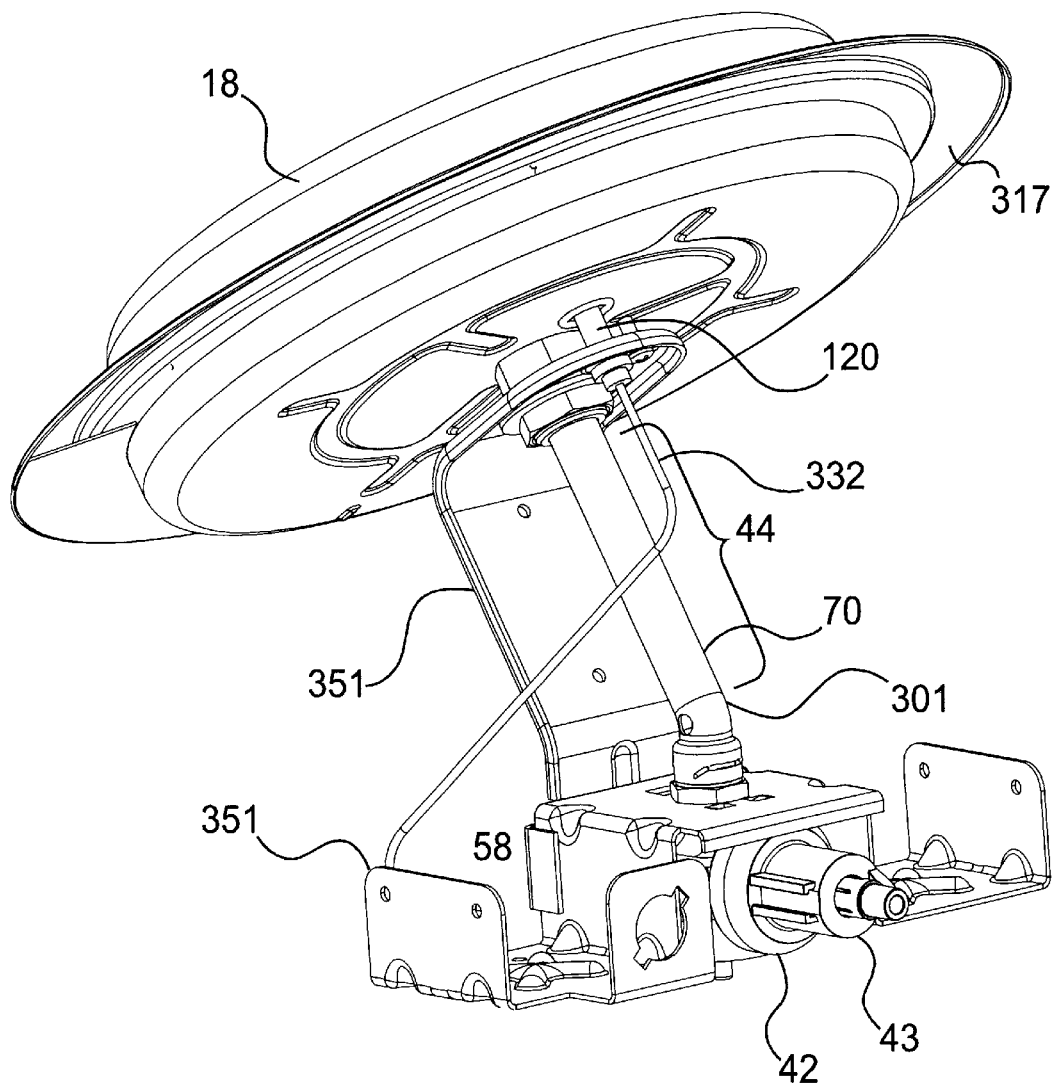
FIG. 14 is a rear perspective view of part of the modified heating apparatus of an exemplary embodiment of a heater assembly according to the present invention.
Figure 15:
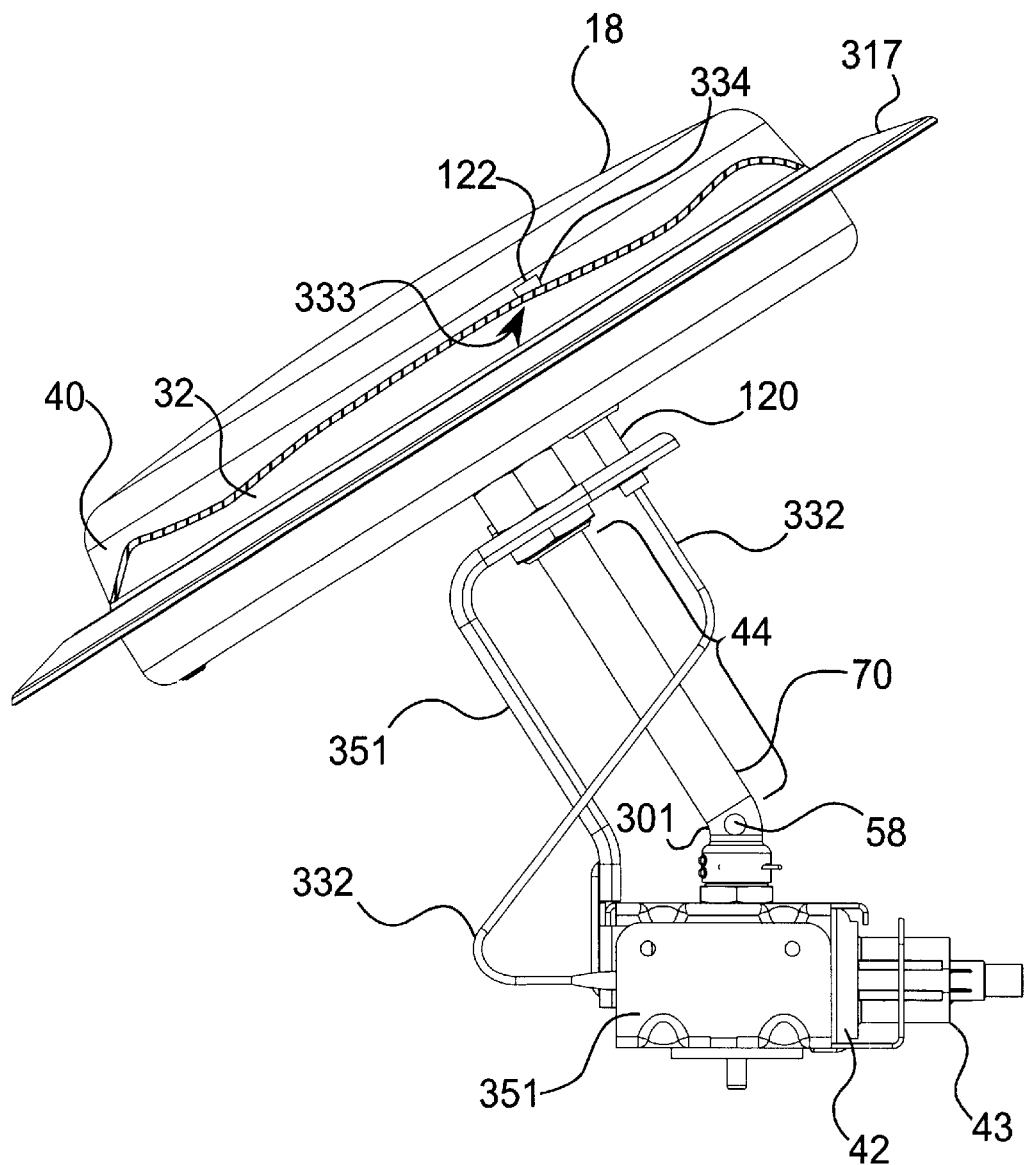
FIG. 15 is a side view of the part of the internal construction of FIG. 14 of an exemplary embodiment of a heater assembly.
Figure 16:
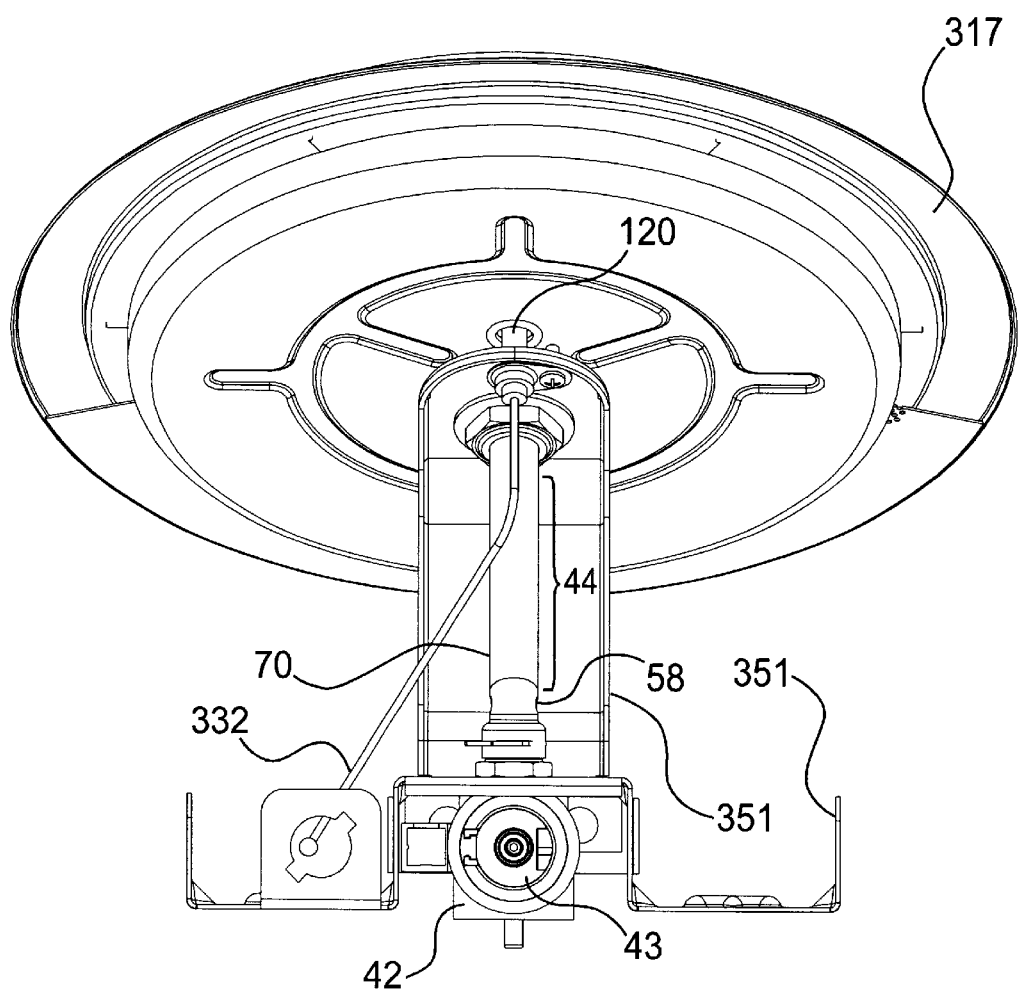
FIG. 16 is a rear view of the part of the internal construction of FIG. 14 of an exemplary embodiment of a heater assembly.

Modified heating apparatus 350 is shown in FIGS. 14–16. FIG. 14 is a rear perspective view of an exemplary embodiment of a modified heating apparatus 350, FIG. 15 is a side view thereof, and FIG. 16 is a rear view thereof. Collar 14 is noticeably absent and unnecessary. In its stead, bracket assembly 351 provides structural support between regulator valve assembly 42 and encasement 310. Bend 301 is noticeable in FIGS. 14–16, and it is reflected in bracket assembly 351.

A number of embodiments of the present invention have been described above. Nevertheless, it will be understood that various changes and modifications to the embodiments described herein will be apparent to those skilled in the art. Such various modifications may be made without departing from the spirit and scope of the invention and without diminishing its attendant advantages. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention described herein as well as all statements of the scope of the invention contained herein.

What is claimed is:

1. A portable heater assembly comprising:
   a fan module having a fan, an electric switch, and electrical wiring, the electrical wiring interconnecting the fan, electric switch and an affixed power cord;
   an electrical ignition assembly having an electrical ignition device, a spark-emitting electrode tip protruding from the electrical ignition device, and an ignition activator connected to the electrical ignition device by an activator connector;
   a heating apparatus having a combustion chamber including a catalyst-containing substrate in proximity to the spark-emitting electrode tip, an air-fuel mixer connected to the combustion chamber, and a regulator valve assembly for coupling the air-fuel mixer to a source of fuel; and
   an encasement having a base, such that the weight of the portable heater assembly is stably distributed over the base;
   wherein the encasement supports and houses the fan module, the electrical ignition assembly, and the heating apparatus; the electric switch activates the fan by forming a closed electrical circuit within the electrical wiring between the power source and the fan; and the electrical ignition assembly ignites the fuel of the heating apparatus.

2. The portable heater assembly of claim 1, wherein the encasement includes left and right halves having lip portions towards a top of the encasement at a rear of the encasement which meet to form a handle, air vents in proximity to a rear of the fan module, and a bezel rim providing support between the heating apparatus and the left and right halves.

3. The portable heater assembly of claim 1, wherein the encasement includes air channels leading from the fan module to and around a perimeter of a head of the heating apparatus, and wherein the fan draws in outside air through vents in the encasement and from around the encasement, and the encasement channels the outside air from the fan through the air channels, expelling the air around the perimeter of the head of the heating apparatus.

4. The portable heater assembly of claim 1, wherein the fan module includes a battery recharger and a power cord.

5. The portable heater assembly of claim 4, wherein the power cord is detachable.

6. A portable heater assembly comprising:
   a fan module having a fan, an electric switch, and electrical wiring, the electrical wiring interconnecting the fan, electric switch and a power source;
   an electrical ignition assembly having an electrical ignition device, a spark-emitting electrode tip protruding from the electrical ignition device, and an ignition activator connected to the electrical ignition device by an activator connector;
   a heating apparatus having a combustion chamber including a catalyst-containing substrate in proximity to the spark-emitting electrode tip, an air-fuel mixer connected to the combustion chamber, and a regulator valve assembly for coupling the air-fuel mixer to a source of fuel; and
   an encasement having a base, such that the weight of the portable heater assembly is stably distributed over the base;
   wherein the encasement supports and houses the fan module, the electrical ignition assembly, and the heating apparatus; the electric switch activates the fan by forming a closed electrical circuit within the electrical wiring between the power source and the fan; the electrical ignition assembly ignites the fuel of the heating apparatus; the source of fuel is a fuel canister; a base portion of the fuel canister is coplanar with a base of the encasement when the fuel canister is installed; and the heating apparatus is angled backward so as to channel hot air currents upward from the base of the encasement.

7. The portable heater assembly of claim 6, wherein the fan module includes a battery pack as the power source.

8. The portable heater assembly of claim 6, wherein the fan module includes a battery recharger and a power cord.

9. The portable heater assembly of claim 6, wherein the combustion chamber is placed at a front of the encasement; the electrical switch, the ignition activator, and a control knob of the regulator valve assembly are placed at a rear of the encasement, opposite the heating apparatus; and the fan module is placed beneath the electrical switch, the ignition activator, and the control knob and in front of a fuel canister connected to the regulator valve assembly as the source of fuel.

10. The portable heater assembly of claim 6, wherein the encasement includes left and right halves having lip portions towards a top of the encasement at a rear of the encasement which meet to form a handle, air vents in proximity to a rear of the fan module, and a bezel rim providing support between the heating apparatus and the left and right halves.

11. A portable heater assembly comprising:

a fan module having a fan, an electric switch, and electrical wiring, the electrical wiring interconnecting the fan, electric switch and a power source;

an electrical ignition assembly having an electrical ignition device, a spark-emitting electrode tip protruding from the electrical ignition device, and an ignition activator connected to the electrical ignition device by an activator connector;

a heating apparatus having a combustion chamber including a catalyst-containing substrate in proximity to the spark-emitting electrode tip, an air-fuel mixer connected to the combustion chamber, a regulator valve assembly for coupling the air-fuel mixer to a source of fuel, and a bracket assembly to provide structural support between the regulator valve assembly, the combustion chamber and the encasement; and an encasement having a base, such that the weight of the portable heater assembly is stably distributed over the base;

wherein the encasement supports and houses the fan module, the electrical ignition assembly, and the heating apparatus; the electric switch activates the fan by forming a closed electrical circuit within the electrical wiring between the power source and the fan; and the electrical ignition assembly ignites the fuel of the heating apparatus.

12. The portable heater assembly of claim 11, wherein the encasement includes left and right halves having lip portions towards a top of the encasement at a rear of the encasement which meet to form a handle, air vents in proximity to a rear of the fan module, and a bezel rim providing support between the heating apparatus and the left and right halves.

13. The portable heater assembly of claim 11, wherein a perforated screen encircles the head of the heating apparatus, the perforated screen situated between the encasement and the perimeter of the head of the heating apparatus, and the air channels leads the outside air to the exit the encasement through the perforated screen.

14. The portable heating apparatus of claim 11, wherein the spark-emitting electrode tip is a center conductor surrounded by a cylindrical sheath within a tubular electrode that is held by a tubular electrode holder through the catalyst-containing substrate so that the electrode is isolated from the fuel inside the combustion chamber.

15. The portable heating apparatus of claim 11, wherein the fan module includes an affixed power cord.

16. A portable heater assembly comprising:

a fan module having a fan, an electric switch, electrical wiring, the electrical wiring interconnecting the fan, electric switch and a power source, a detachable covering having an attached hose, and the detachable covering may be attached to the fan module to enclose an air intake portion of the fan module, causing the fan to draw air through the hose;

an electrical ignition assembly having an electrical ignition device, a spark-emitting electrode tip protruding from the electrical ignition device, and an ignition activator connected to the electrical ignition device by an activator connector;

a heating apparatus having a combustion chamber including a catalyst-containing substrate in proximity to the spark-emitting electrode tip, an air-fuel mixer connected to the combustion chamber, and a regulator valve assembly for coupling the air-fuel mixer to a source of fuel; and an encasement having a base, such that the weight of the portable heater assembly is stably distributed over the base;

wherein the encasement supports and houses the fan module, the electrical ignition assembly, and the heating apparatus; the electric switch activates the fan by forming a closed electrical circuit within the electrical wiring between the power source and the fan; and the electrical ignition assembly ignites the fuel of the heating apparatus.

17. The portable heater assembly of claim 16, wherein an end of the hose not attached to the covering may be releasably attached to an opening in a tent wall, causing the fan to draw air from outside the tent wall through the hose and expel the outside air through the encasement and into the tent.

18. The portable heater assembly of claim 16, wherein the encasement includes left and right halves having lip portions towards a top of the encasement at a rear of the encasement which meet to form a handle, air vents in proximity to a rear of the fan module, and a bezel rim providing support between the heating apparatus and the left and right halves.

19. The portable heater assembly of claim 16, wherein a perforated screen encircles the perimeter of the head of the heating apparatus, the perforated screen situated between the encasement and the perimeter of the head of the heating apparatus; and the air channels lead the outside air to the exit the encasement through the perforated screen.

20. The portable heater assembly of claim 16, wherein the spark-emitting electrode tip is a center conductor surrounded by a cylindrical sheath within a tubular electrode that is held by a tubular electrode holder through the catalyst-containing substrate so that the electrode is isolated from the fuel inside the combustion chamber.

\* \* \* \* \*